United States Patent Office 3,070,525
Patented Dec. 25, 1962

3,070,525
METHODS OF PROTECTING GRAPHITE SURFACES
Hugh Wilson Davidson, Pinner, and John Walter Ryde, Northwood, England, assignors to The General Electric Company Limited, London, England
No Drawing. Filed Oct. 28, 1957, Ser. No. 692,583
Claims priority, application Great Britain Oct. 29, 1956
7 Claims. (Cl. 204—154.2)

This invention relates to methods of protecting graphite surfaces and particularly to a method of protecting graphite surfaces against the effects of materials which contact the surfaces whilst the surfaces are at elevated temperatures.

The term "surface" in the present context is intended to include the whole surface accessible to the material. Since the invention is primarily for use where gaseous materials are concerned, "surface" will include the internal as well as the outside or geometrical surface of the graphite.

In nuclear reactors which are cooled by gas, such as carbon dioxide, and use graphite as a moderating material, the coolant gas where it leaves a channel provided in the moderator of the nuclear reactor, and the graphite itself, may well be at such temperatures that the nearby graphite surfaces are attacked by the coolant gas, the graphite passing into the coolant stream in the form of carbon monoxide. Such an attack can produce serious corrosion of the graphite surfaces and an object of the present invention is the provision of a method of protecting a graphite surface against such corrosion.

According to the present invention, a method of protecting a graphite surface against the effects of a material which contacts the surface while the surface is at an elevated temperature, comprises subjecting the surface to an atmosphere of or containing nickel carbonyl to cause nickel to be deposited on the surface and heating the surface at least to the said elevated temperature in order to fix the nickel in place.

The nickel may be fixed in place by heating the surface in an inert atmosphere. Preferably, the graphite whose surface is to be protected is first of all placed in an enclosure which is first evacuated and then filled with nickel carbonyl vapour, any vapour which has not decomposed being subsequently drawn off together with gaseous products of decomposition, and the enclosure is finally filled with an inert atmosphere while the surface is heated to the said elevated temperature.

The invention is more particularly, but not exclusively, applicable where the material which contacts the graphite surface is carbon dioxide. It has been shown that the thermal corrosion of graphite by carbon dioxide takes place uniformly over the internal surface of the graphite. Oxidization takes place first by the deposition of oxygen on certain "active sites" on the internal graphite surface:

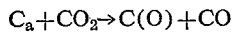

at higher temperature gasification of the surface oxide occurs, accompanied by loss of graphite:

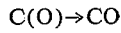

In operation of the present invention, nickel carbonyl is allowed to reach the internal surface and deposit nickel on the "active sites." The "active sites" on the whole of the internal and external surfaces of the graphite are thereby prevented from taking part in subsequent oxidization of the carbon by carbon dioxide. In order to fix the nickel in position on the "active sites" it is necessary to heat the surface at least to the temperature at which thermal corrosion in the presence of carbon dioxide would otherwise be expected. The nickel and the carbon then form a eutectic which acts as a stabilised inert surface. Clearly this process requires the deposition of only small amounts of nickel in order to produce an inert graphite.

At low, i.e., ordinary or atmospheric, temperatures, nickel carbonyl will diffuse into the internal surface of the graphite. However, if the graphite is at a temperature of 100° C. or 200° C., and increasingly at higher temperatures, the nickel carbonyl will decompose on the external surface of the graphite and will not penetrate into the interior. Since the external film so formed is of a crystalline nature and discontinuous, it is easily penetrable by carbon dioxide which can still corrode the interior of the graphite. It is therefore necessary that the graphite should be at low or atmospheric temperature when it is first subjected to the atmosphere of, or containing, nickel carbonyl.

In carrying the invention into effect, according to one example, a graphite specimen is placed in one of a pair of tubular vessels connected together at the top by a manifold, the outlet from which runs to a vacuum pump through a tap which may also be used to connect the manifold to a source of inert gas such as argon. Liquid nickel carbonyl is contained in the other tubular vessel, which may be immersed in a container full of liquid air. It will be appreciated that, when the nickel carbonyl is at the temperature of the liquid air, its vapour pressure is negligible and the graphite specimen may be evacuated by connection to the vacuum pump. After such evacuation, the tap connecting the manifold to the pump is closed and the liquid air is removed from around the vessel containing nickel carbonyl. The whole surface, both internal and external, of the graphite specimen is thus subjected to an atmosphere of nickel carbonyl vapour and nickel is deposited upon the "active sites" of the graphite. The liquid air is now replaced around the nickel carbonyl and the graphite specimen again connected through the tap to the vacuum pump, so that any nickel carbonyl vapour which has not decomposed is drawn off the graphite together with the gaseous products of decomposition, which will mainly consist of carbon monoxide. Finally, the tap is turned so that the graphite is now in an inert atmosphere, whereupon it is heated through an eddy-current heating equipment whose coil surrounds the vessel opposite the graphite, to a temperature of approximately 500° C. This temperature is somewhat higher than the temperature of carbon dioxide leaving channels in the graphite moderator of a nuclear reactor of the Calder Hall type as at present designed.

The invention includes a member of article having a graphite surface protected by the method according to the invention. Since nickel has a higher capture cross-section for thermal neutrons than carbon, there will be a maximum tolerable quantity of nickel for any given reactor design such that, if the quantity of nickel exceeds this amount, the chain reaction will not be self-perpetuating. Where natural uranium is used as the fuel, this maximum allowable amount of nickel may be small and it may be desirable to treat only certain parts of the graphite moderator in this way. For example, the centre of the moderator or the exits for the coolant gas from channels in the moderator structure may be the places where, due to excessive radiation or high temperatures, corrosion is most likely to take place. In assembling graphite blocks before the reactor is put into operation, therefore, the blocks occupying such positions may be treated by the method according to the invention while other parts of the moderator structure are left untreated.

Alternatively, since the amount of nickel which needs to be deposited will only be of the order of 100 to 200 parts of weight of nickel to 1,000,000 parts of weight of graphite, it may be allowable to treat the whole moderator structure in this way. This may be done before assembly, but it is possible to protect the graphite surface of the reactor at any time by ceasing operation of the reactor and allowing the moderator to cool down. Nickel carbonyl may then be fed into the coolant system of the nuclear reactor so that it is carried by the current through channels in the graphite moderator while the said moderator is cooled. Subsequently, the nuclear reactor may be operated so that the moderator attains its normal elevated temperature and the nickel deposit on the graphite surface from the nickel carbonyl is fixed in place. The nickel will be deposited preferentially on the carbon rather than adjacent metal surfaces at the same temperature, and it has been shown by experiment that the nickel deposit has no catalytic action on the oxidization of the graphite.

In addition to the moderator itself, or instead of the moderator, a surface of other graphite components used in a nuclear reactor may be treated by the method according to the invention. The method is not restricted to use where carbon dioxide gas constitutes the material which contacts the surface, and may also be employed in protecting the graphite against chemical action due to corrosive liquids which might penetrate the interior of the graphite.

We claim:

1. A method of protecting a graphite surface against the effects of a material which contacts the surface while the surface is at a substantially elevated temperature, comprising subjecting said surface at ordinary atmospheric temperature to an atmosphere including nickel carbonyl to cause nickel to be deposited on the surface and thereafter heating the surface at least to the said elevated temperature in order to fix the nickel in place.

2. A method as claimed in claim 1 wherein the elevated temperature is at least 500° C.

3. An article of graphite made corrosion-resistant by the method claimed in claim 1 and containing in the order of 100 to 200 parts by weight of nickel per 1,000,000 parts by weight of graphite.

4. A method as claimed in claim 1, wherein the nickel is fixed in place by heating the surface in an inert atmosphere.

5. A method as claimed in claim 4, wherein the graphite whose surface is to be protected is placed in an enclosure which is first evacuated and then filled with nickel carbonyl vapour, any vapour which has not decomposed being subsequently drawn off together with gaseous products of decomposition, and the enclosure being finally filled with an inert atmosphere while the surface is heated to the said elevated temperature.

6. A method of protecting the graphite surface of a gas-cooled graphite-moderated nuclear reactor, comprising feeding nickel carbonyl into the coolant system of the nuclear reactor at ordinary atmospheric temperature so that it is carried into contact with the graphite by the gaseous coolant through channels in the graphite moderator while the said moderator is cold, and subsequently operating the nuclear reactor so that the moderator attains its normal elevated temperature.

7. A method as claimed in claim 6 wherein the elevated temperature is at least 500° C.

References Cited in the file of this patent

UNITED STATES PATENTS

| | | |
|---|---|---|
| 1,816,476 | Fink et al. | July 28, 1931 |
| 2,154,278 | Mouromtseff | Apr. 11, 1939 |
| 2,304,182 | Lang | Dec. 8, 1942 |
| 2,698,812 | Schladitz | Jan. 4, 1955 |
| 2,918,392 | Beller | Dec. 22, 1959 |
| 2,995,471 | Gurinsky | Aug. 8, 1961 |

OTHER REFERENCES

Reactor Handbook (AECD–3647), vol. 3 (Materials), pages 151–152, published by USAEC (February 1955).

Chem. Reviews, vol. 21 (August 1937), pages 3–5.

Mellor: Comprehensive Treatise on Inorganic and Theoretical Chemistry, vol. 5, page 953, Longmans, Green and Co. (1924).